UNITED STATES PATENT OFFICE.

FRITZ BENDER, OF FRANKFORT-ON-THE-MAIN, GERMANY, ASSIGNOR TO FARBWERK MÜHLHEIM, VORMALS A. LEONHARDT & CO., OF MÜHLHEIM-ON-THE-MAIN, GERMANY.

PROCESS OF MAKING PHENYL-GLYCOCOL-ORTHO-CARBOXYLIC ACID.

SPECIFICATION forming part of Letters Patent No. 662,755, dated November 27, 1900.

Application filed July 28, 1900. Serial No. 25,146. (No specimens.)

*To all whom it may concern:*

Be it known that I, FRITZ BENDER, chemist, doctor of philosophy, a subject of the Emperor of Germany, residing at 85 Mainzerlandstrasse, Frankfort-on-the-Main, in the Kingdom of Prussia, Germany, have invented new and useful Improvements in the Manufacture of Phenyl-Glycocol-Ortho-Carboxylic Acid, (for which Letters Patent have been applied for in England, No. 5,763, filed March 27, 1900; in Germany, F. 12,488, filed December 18, 1899, and F. 12,442, filed December 4, 1899, and in France, No. 287,746, filed April 21, 1900,) of which the following is a specification.

This invention relates to a new process for the manufacture of phenyl-glycocol-ortho-carboxylic acid and certain derivatives thereof, such as alkali salts or esters. These substances constitute important initial materials in the synthetic production of indigo, and on account of the cheapness of this new process and the ease with which it is carried out my invention promises to be of considerable technical importance.

The starting-point of this process is anthranilic acid, which I convert into a new substance, cyanmethyl-anthranilic acid, (to which, for the sake of brevity, I may hereinafter refer to as the "new" acid,) by a new process, which consists in treating anthranilic acid with hydrocyanic acid and formic aldehyde, which new acid and the new process for producing the same I have made the subject of a separate application for Letters Patent, Serial No. 25,145, filed July 28, 1900. This new substance (cyanmethyl-anthranilic acid) can be converted by saponification into phenyl-glycocol-ortho-carboxylic acid or derivatives, such as salts or esters of the same, dependent upon the conditions under which the saponification is carried out. It will be observed that my new substance, which is a nitrile as well as an acid, on saponification and dependent upon the conditions of such saponification and the reagents with which it is carried out, may or may not yield those intermediate products usually observed in the saponification of nitriles—for example, acid amids. I have been able to convert the new acid into the corresponding acid amid and into the corresponding thiamid, and both these I have been able to convert into phenyl-glycocol-ortho-carboxylic acid or esters or salts of the same. It is evident, therefore, that for the purposes of this my invention any partial or any intermediate saponification product of this new substance—namely, cyanmethyl-anthranilic acid—is equivalent to cyanmethyl-anthranilic acid itself. Therefore I hereinafter use the term "cyanmethyl-anthranilic acid body" to include not only cyanmethyl-anthranilic acid itself and its esters and alkali salts, but also the acid amid and thiamid derivatives of the same. Hereinafter I also use the term "phenyl-glycocol-ortho-carboxylic acid body" to include not only phenyl-glycocol-ortho-carboxylic acid itself, but also its esters and its alkali salts.

In the following I describe the method of producing cyanmethyl-anthranilic acid and esters of the same and acid amid and thiamid and the production of phenyl-glycocol-ortho-carboxylic acid and its esters from these initial materials. I therefore illustrate the nature of my invention by the following examples; but I do not wish it to be understood that the invention is limited to these examples. The parts are by weight.

*Example 1—Production of cyanmethyl-anthranilic acid.*—Make a solution of thirteen and seven-tenths (13.7) parts of anthranilic acid (in the form of its hydrochloric acid salt) in about one hundred (100) parts of water. At the ordinary temperature add an aqueous solution of six and seven-tenths (6.7) parts of potassium cyanid, (one hundred per cent.) Care is to be taken that the liquid at this stage does not turn Congo paper blue. If, however, such condition does exist, it must be removed by the addition of potassium cyanid, of sodium acetate, or the like. Now add seven and one-half (7.5) parts of a forty-per-cent. solution of formic aldehyde and stir the liquid. The cyanmethyl-anthranilic acid separates out as a white precipitate.

*Example 2—Production of an ester of cyanmethyl-anthranilic acid.*—Seventeen (17) parts of the product of Example 1 are dissolved in six (6) parts of carbonate of soda in the form of a ten-per-cent solution. Cool and add to the cold solution forty-five (45) parts of ethyl alcohol and fifteen (15) parts of ethyl bromid and heat in a closed vessel for about twelve hours by means of a boiling water-bath. After cooling, the greater part of the ester will be found to have crystallized out. This ester does not dissolve in carbonate of soda solution. It can be crystallized from dilute alcohol and then melts at eighty-nine (89°) degrees centigrade. In an analogous manner the methyl ester may be obtained. This ester melts at one hundred and six (106°) degrees centigrade.

*Example 3—Production of an acid amid.*—One (1) part of the dry product of Example 1 is introduced at the ordinary temperature into ten (10) parts of concentrated sulfuric acid and the whole allowed to stand until a test portion is wholly or almost wholly soluble in water, which is usually the case after about twenty-four hours. Now pour upon ice and precipitate the acid amid by means of carbonate of soda. This amid is soluble in dilute acids or alkalies. It can be crystallized from water and then melts at one hundred and ninety-five (195°) degrees centigrade. In a similar manner the acid amids corresponding to the products of Example 2 can be obtained. The acid amid of ethyl ester is insoluble in dilute acids and alkalies, can be recrystallized from dilute alcohol, and then melts at one hundred and eighty (180°) degrees centigrade. The corresponding amid of the methyl ester melts at one hundred and ninety-five (195°) degrees centigrade.

*Example 4—Production of a thiamid.*—Dissolve the product of Example 1 in water with the aid of ammonia water and then add an excess of yellow ammonium sulfid. Allow it to stand for about twelve (12) hours. Boil until the ammonium sulfid is mostly driven off. Filter and precipitate the thiamid from the filtrate by means of hydrochloric acid. The thiamid is of a yellowish color and melts with decomposition at about one hundred and ninety (190°) degrees centigrade.

All the products of the preceding examples on treatment with hot dilute caustic-soda solution and subsequent treatment with hydrochloric acid yield phenyl-glycocol-ortho-carboxylic acid. Of course other saponifying agents may be employed; but I prefer to use caustic soda as a saponifying agent.

*Example 5—Production of phenyl-glycocol-ortho-carboxylic acid without isolating intermediate products.*—For this purpose it is not necessary to isolate the product of Example 1, but the liquid resulting from said example and which carries my new acid can be treated with forty (40) parts of caustic-soda solution of thirty (30) per cent. The solution so resulting is then boiled until evolution of ammonia ceases. Cool and acidulate slightly with hydrochloric acid. The product which separates out is phenyl-glycocol-ortho-carboxylic acid in a quite pure state.

*Example 6—Production of an ester of phenyl-glycocol-ortho-carboxylic acid without isolating intermediate products.*—Eighteen (18) parts of the product of Example 1 are boiled under a backflow-condenser with a mixture consisting of eighty (80) parts methyl or ethyl alcohol and twenty-seven (27) parts of sulfuric acid of approximately monohydrate strength for about eight (8) hours. Drive off the alcohol by means of a water-bath and pour the residue into an excess of a cold solution of sodium carbonate. The ester separates out in a crystalline condition. The methyl ester melts at about ninety-seven (97°) degrees centigrade and the ethyl ester at about seventy-seven (77°) degrees centigrade. The same product may of course be obtained by dissolving the product of Example 1 in about five (5) parts of the appropriate alcohol and saturating the so-resulting solution with hydrochloric-acid gas in the cold, allowing it to stand for about twelve (12) hours, then boiling for about two hours under a backflow-condenser, and working up, as usual.

*Example 7—Production of a phenyl-glycocol-ortho-carboxylic acid body from the product of Example 2.*—By boiling the ethyl alcohol product of Example 2 with a mixture consisting of three (3) parts of concentrated hydrochloric acid and three (3) parts of water under a backflow-condenser for several hours a crystalline body separates out which probably is phenyl-glycocol-ortho-carboxylic-ethylester and which melts at one hundred and eighty-four (184°) degrees centigrade.

For the purposes of Examples 5 and 6 the products of Examples 2, 3, and 4 are equivalents of the product of Example 1, and by making the appropriate changes in the directions of Examples 5 and 6 the same products may be obtained. It is also evident that appropriate derivatives of Examples 3 and 4 can be employed in Example 7 as initial material in the place of the product of Example 2.

By this application I desire to protect this process for making phenyl-glycocol-ortho-carboxylic acid whether the starting-point be anthranilic acid or the intermediate product resulting from it—namely, cyanmethyl-anthranilic acid or any of the intermediate saponification products of the latter.

Now what I claim is—

1. The process of manufacturing a hereinbefore-defined phenyl-glycocol-ortho-carboxylic acid body which consists in treating anthranilic acid with hydrocyanic acid and formic aldehyde and saponifying the resulting product, substantially as described.

2. The process of manufacturing phenyl-glycocol-ortho-carboxylic acid from anthranilic acid, formic aldehyde and hydrocyanic acid, generating the hydrocyanic acid required within the melt from potassium cyanid and the hydrochlorid of anthranilic acid and saponifying the resulting product by means of caustic soda, substantially as described.

3. The improvement in the process of manufacturing a hereinbefore-defined phenyl-glycocol-ortho-carboxylic acid body which consists in saponifying a hereinbefore-defined cyanmethyl-anthranilic acid body, substantially as described.

4. The improvement in the process of manufacturing a hereinbefore-defined phenyl-glycocol-ortho-carboxylic acid body which consists in saponifying a hereinbefore-defined cyanmethyl-anthranilic acid body with caustic soda, substantially as described.

In testimony whereof I have signed my name to this specification in the presence of two subscribing witnesses.

FRITZ BENDER.

Witnesses:
JEAN GRUND,
RICHARD GUENTHER.